J. H. PARSONS.
APPARATUS FOR FEEDING AIR TO FURNACES.
APPLICATION FILED MAY 5, 1909. RENEWED AUG. 16, 1913.
1,092,854.
Patented Apr. 14, 1914.
3 SHEETS—SHEET 1.
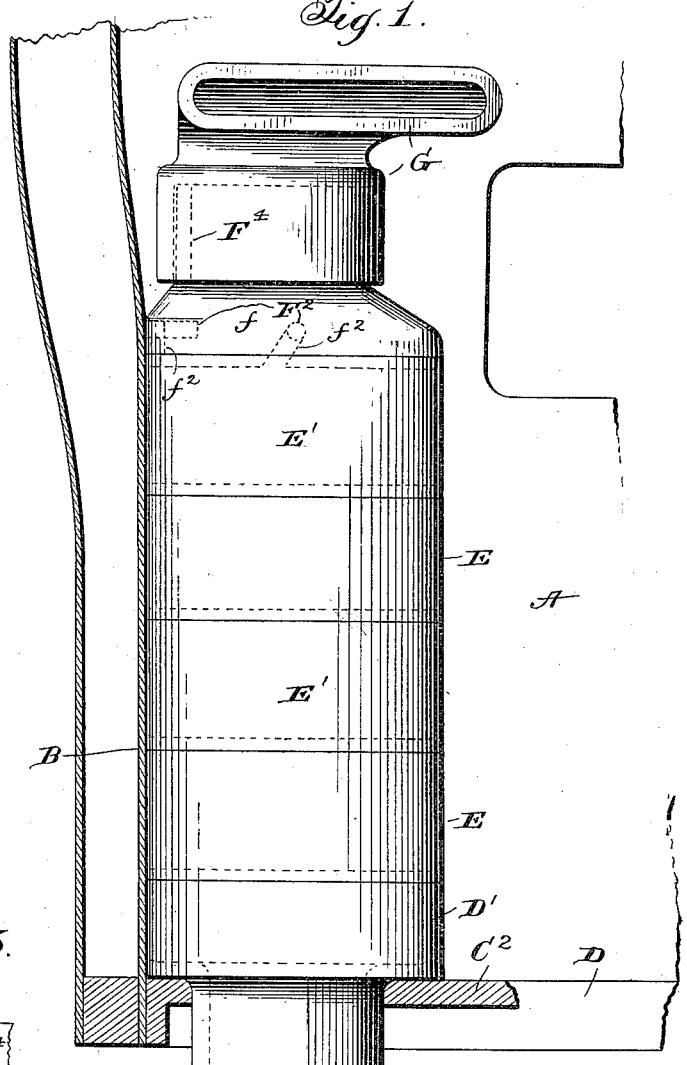
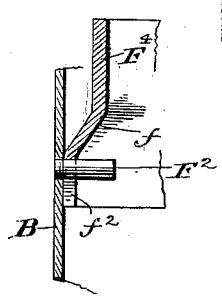

J. H. PARSONS.
APPARATUS FOR FEEDING AIR TO FURNACES.
APPLICATION FILED MAY 5, 1909. RENEWED AUG. 16, 1913.
1,092,854.
Patented Apr. 14, 1914.
3 SHEETS—SHEET 2.
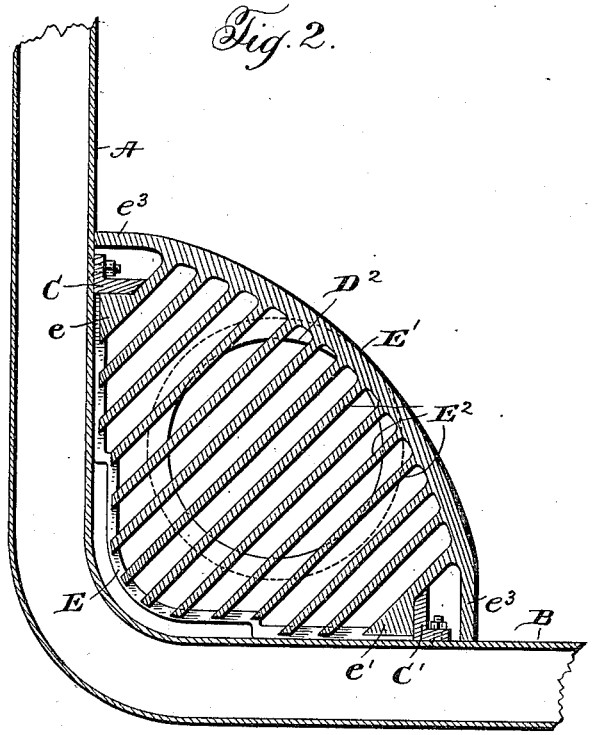
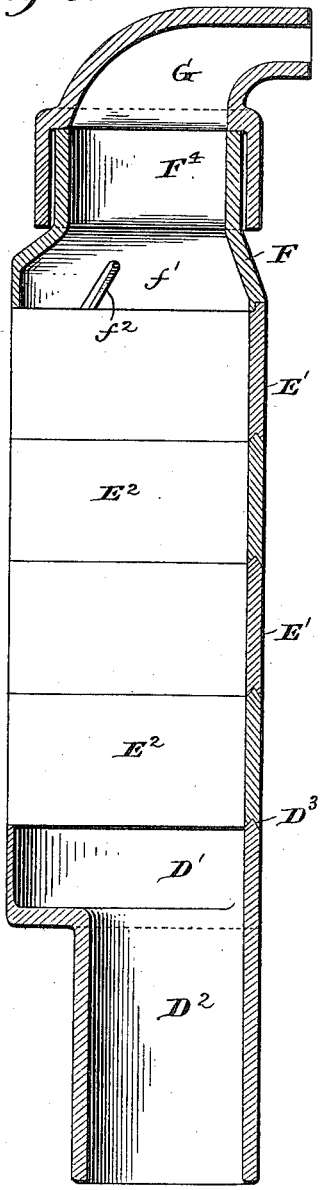
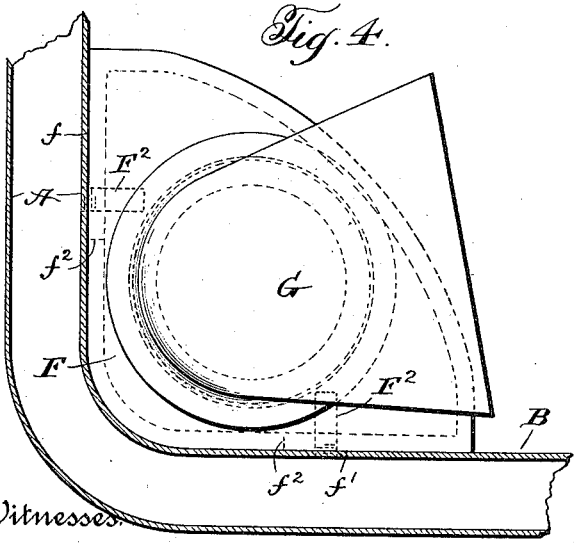

J. H. PARSONS.
APPARATUS FOR FEEDING AIR TO FURNACES.
APPLICATION FILED MAY 5, 1909. RENEWED AUG. 16, 1913.
1,092,854.
Patented Apr. 14, 1914.
3 SHEETS—SHEET 3.
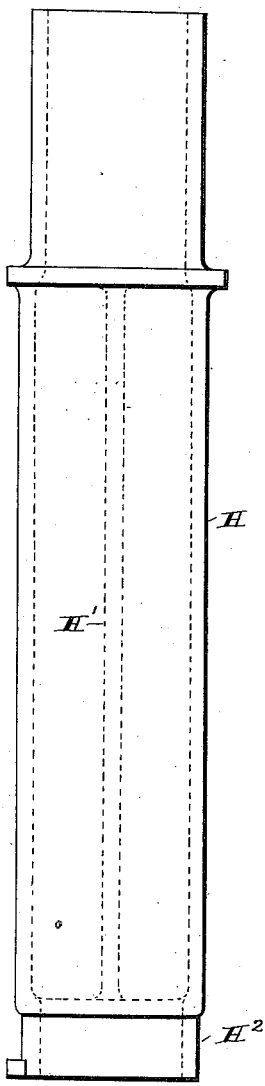
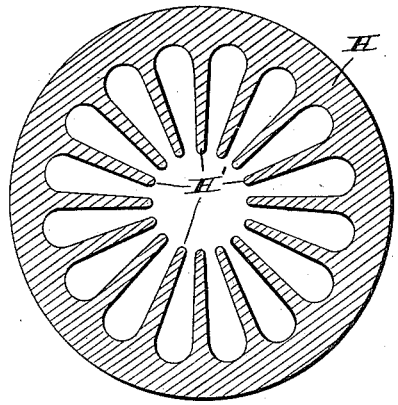

UNITED STATES PATENT OFFICE.

JOHN H. PARSONS, OF RIDLEY PARK, PENNSYLVANIA, ASSIGNOR TO PARSONS ENGINEERING COMPANY, OF WILMINGTON, DELAWARE, A CORPORATION OF DELAWARE.

APPARATUS FOR FEEDING AIR TO FURNACES.

1,092,854.   Specification of Letters Patent.   Patented Apr. 14, 1914.

Application filed May 5, 1909, Serial No. 494,147. Renewed August 16, 1913. Serial No. 785,129.

*To all whom it may concern:*

Be it known that I, JOHN H. PARSONS, a citizen of the United States, residing at Ridley Park, in the county of Delaware and State of Pennsylvania, have invented certain new and useful Improvements in Apparatus for Feeding Air to Furnaces, of which the following is a specification, reference being had therein to the accompanying drawing.

This invention relates to an improvement in apparatus for feeding air to furnaces above the bed of fuel, so as to create a combustion of the gases arising from the burning body of fuel on the grate.

The invention is designed more particularly for use in connection with locomotive fire boxes, although in this particular it is not to be understood as being limited in that respect in its useful application.

In equipping locomotive fire boxes with air feeding nozzles and pipes, I have found that it is of great advantage to have the same so positioned as to abstract sufficient heat from the burning bed of fuel to heat the air passing through the nozzles to a degree as near as possible that of kindling. This is important, in that the hotter the inflowing currents of air, the more rapid and complete will be the combustion of the gases within the fire box. Manifestly, in securing this desired amount of heat for the air, the conductor or pipes passing through the incandescent body of fuel are subjected to a very high degree of heat, and if they are made of metal they soon deteriorate, warp or become melted down. To avoid this, I have employed facings of fire brick which has in a measure been very satisfactory.

In railway equipment, it has been found necessary, or at least advisable, to provide the various features of construction so that they can be readily replaced if broken or melted and to provide structures which will resist the constant vibrations incident to locomotive service, and it is also manifestly important that these heating supply pipes should be made as nearly permanent and without a lining if possible, and it is with this in view that the present invention is provided.

The invention broadly speaking, comprehends preferably a metallic conductor having a series of integral heat conducting ribs, fins or projections extending inwardly from the surface of the conductor directly exposed to the heat, so that the heat will be conducted from the exposed wall into the passage through which the air is driven and will be taken up by the air rapidly, thus heating the air to the desired temperature.

An object of the invention is also the provision of an air conductor which is made in sections and positioning said sections so that they can be readily removed and replaced, and so without the necessity of employing fastening means or bolts for retaining the respective sections in place.

A further object of the invention is the provision of an air conductor which will be in form rendering it possible to utilize two sides of the fire box as walls for the conductor.

Other objects of the invention will presently be stated.

In the drawings, I have shown a convenient embodiment of the invention in a preferred form, it being understood, however, that changes can be made without departing from the nature and principle of the invention. As emphasizing my desire to be understood as covering the principles involved, as well as the structural features, I have also shown in the drawing a modified form of construction and other forms undoubtedly can be made and still be within the spirit of the invention.

In the accompanying drawings, Figure 1 designates an elevation of one corner of a fire box of a locomotive showing the improved conductor placed therein, Fig. 2 is a cross section midway of the conductor, Fig. 3 is a longitudinal section of the conductor detached, Fig. 4 is a top plan view of the conductor, Fig. 5 is a detail section showing the manner of attaching the upper commingling chambered part of the conductor in place, and Figs. 6 and 7 are elevations and cross sections of modified forms.

A designates the front, and B the side walls of the locomotive fire box of any convenient form from which are extended angle bars or other suitable projecting parts C and C'. These angle bars may be bolted directly to the side sheets of the fire box, as shown, or they may be made or secured in any other suitable manner.

D designates the grate having at the corner below the air conductor presently to be referred to, a base supporting plate C², secured in any desirable manner to the grate carrier or the walls of the fire box. On the supporting plate is the lower section D' of the air conductor, the said section consisting conveniently of a metal box-like structure having depending from its under side a neck piece D² projecting below the surface of the grate. This box-like structure has its interior wholly unoccupied and serves as a distributing receptacle for the air as it enters in a manner presently to be described. The distributing receptacle or part D' is preferably made of cast steel and is shaped with its outer face bent out slightly, while its side faces are adapted to conform to the angle formed by the side walls of the fire box. In other words, the structure is substantially, but not accurately, triangular in cross section at the top, while the depending part is circular. The upper edge D³ of the outer wall is conveniently of V-shape, as shown in the sectional view whereby the sections when in position will be interlocked.

E designates a series, four being shown, of conductor sections. All of these sections are formed alike, so that the description of one will suffice. They are made of cast metal, preferably having an outer face E', and this outer face constitutes in effect the supporting and carrying element of the section. From the outer face part projects a multitude of integral ribs E², varying in width but conveniently of uniform thickness, the variation in the width being governed by the distance between the outer face or plate E' and the side walls of the fire box. These ribs are all spaced apart and the distance between the outer face of the section and the far edges of the ribs may be of any desired length but necessarily slightly less than the distance between the outer face of the section and the side walls of the fire box, so that there will be no touching or direct contact of the ribs with the fire box walls. By forming the ribs so that they will not be in contact with the walls of the fire box, the heat will not be radiated from the ribs to the fire box walls and by spacing the ribs well apart the unoccupied area will be substantially equal to that of the intake of the conductor. Each section is provided with interlocking edges, the lowermost section having a V-shaped channel in its face part, into which the upper edge of the part D³ extends, thus forming a closed joint between the various members.

To secure the sections in place and so in a manner that they may be readily removed, I form conveniently on the outer face of the inner ends of the end ribs projections e, e'. These projections e, e', are designed to engage with vertically disposed angle brackets or bars C, C', bolted to the side walls of the furnace. The angle or securing bars C, C' are so positioned relative to the various sections that they will be in close contact with the projecting parts e, e', when the sections are in place, and owing to the fact that the two angle bars are at right angles to each other, they will serve to hold the sections firmly in place against outward movement or lateral movement parallel with the side walls of the fire box. It will be noticed, however, that to place the sections, it will only be necessary to first place them over the top of the securing bars and move them down to their proper positions. By this construction, the securing means are located in a guarded position against the direct heat of the fire box, leaving exposed only the outer face of the various sections. It is to be understood, however, that any desired means can be employed for securing the sections permanently or removably in place, as may be desired.

Resting on the upper section is the commingling chamber section F. This member is formed with an angular portion adapted to fit the corner of the fire box, and in the straight sides f, f' thereof are formed inclined slots f², the inclination being outward from the corner of the fire box. Suitable securing pins F² are tapped into the fire box sheets, as shown, the same being projected outwardly at right angles to each other. These pins engage in the inclined slots in the section F, so that in placing the section, the same may be forced rearward, and when so placed the pins will be at the upper ends of the slots or inclines, thus preventing the upward movement of the commingling section F, as well as preventing the outward movement. I employ the term " preventing " with reference to any accidental displacement of this section, but it will be obvious that the construction is such that the section can be readily removed and so without the necessity of removing nuts, bolts or other fastening means. The commingling section F is contracted gradually upward and terminates in a cylindrical part F⁴, on which is seated the nozzle G. This nozzle may be of any convenient formation, its lower edge being flanged to overlap and embrace the upper edge of the cylindrical part F⁴.

By constructing the air conductor in the manner above described, it will be readily appreciated that the supporting bars C and C' may be inclined to correspond with the inclination of many of the modern type of locomotive fire boxes and in that condition the various sections of the conductor can be as readily placed in position quickly as when in a vertical position.

In Figs. 6 and 7, I have shown a modified form of radiating conductor, which is in form cylindrical, the radiating flanges being projected toward the center from the sides of the pipe. In these figures, H designates the outer plates or portions, and H' the radiating ribs or flanges. This form may be made in sections, as shown, and the supporting portion H² may be secured, as in the other form. Any convenient form of nozzle may be employed in this connection, and the pipe sections are supported in their positions by their own weight or may be attached in any suitable manner.

By conducting the heat from the facings or outer plates rapidly, the plates are preserved against the melting tendency of the fire and will therefore last a greater length of time without distortion or melting, than other forms of conductor pipes. It will also be noticed that by utilizing the sections shown in the preferred form, I am enabled to do away with what may be strictly called a pipe formation and utilize the walls of the fire box as walls for the air conductor. It will also be appreciated that the sections can be readily cast and that the conductors can be easily placed in position or removed for repair, should such be necessary.

Having thus described the invention, what is claimed as new and desired to be secured by Letters Patent is:

1. In a furnace fire box an air conductor comprising a base member having a chambered upper portion, a series of conductor members located on the base and provided with a series of integral heat radiating ribs projecting into the air space, a commingling chambered member at the upper end of the conductor and a nozzle on the said last mentioned member.

2. In a fire box for furnaces, an air conductor comprising in part, a series of removable sections and an upper commingling section or part having inclined slots entering from its lower edge, the said sections being interlocked; and projections from the walls of the fire box engaging in the said inclined slots whereby the various sections are secured in place.

In testimony whereof I affix my signature in presence of two witnesses.

JOHN H. PARSONS.

Witnesses:
Thomas H. Berry,
Elwood Tyson.